United States Patent [19]

Burnett

[11] Patent Number: 4,648,155
[45] Date of Patent: Mar. 10, 1987

[54] CHICKEN DEBONING APPARATUS AND METHOD

[76] Inventor: T. J. Burnett, Box 147, Rte. 1, Murrayville, Ga. 30564

[21] Appl. No.: 840,731

[22] Filed: Mar. 18, 1986

[51] Int. Cl.⁴ .............................................. A22C 21/00
[52] U.S. Cl. ............................................. 17/46; 17/11
[58] Field of Search .,............................. 17/11, 46, 56

[56] References Cited

U.S. PATENT DOCUMENTS 4,557,017 12/1985 Gasbarro ................................ 17/11
4,567,624 2/1986 van Mil ................................ 17/46 X
4,597,136 7/1986 Hazenbroek ............................ 17/11

Primary Examiner—Willie G. Abercrombie
Attorney, Agent, or Firm—Needle & Rosenberg

[57] ABSTRACT

A method and an apparatus for removing meat and wings from an eviscerated bird wherein the wings are partially severed at the joint between the body and the wing and gripping the wings and pulling them away from the body such that the wings and connected breast meat are removed from the body.

17 Claims, 9 Drawing Figures

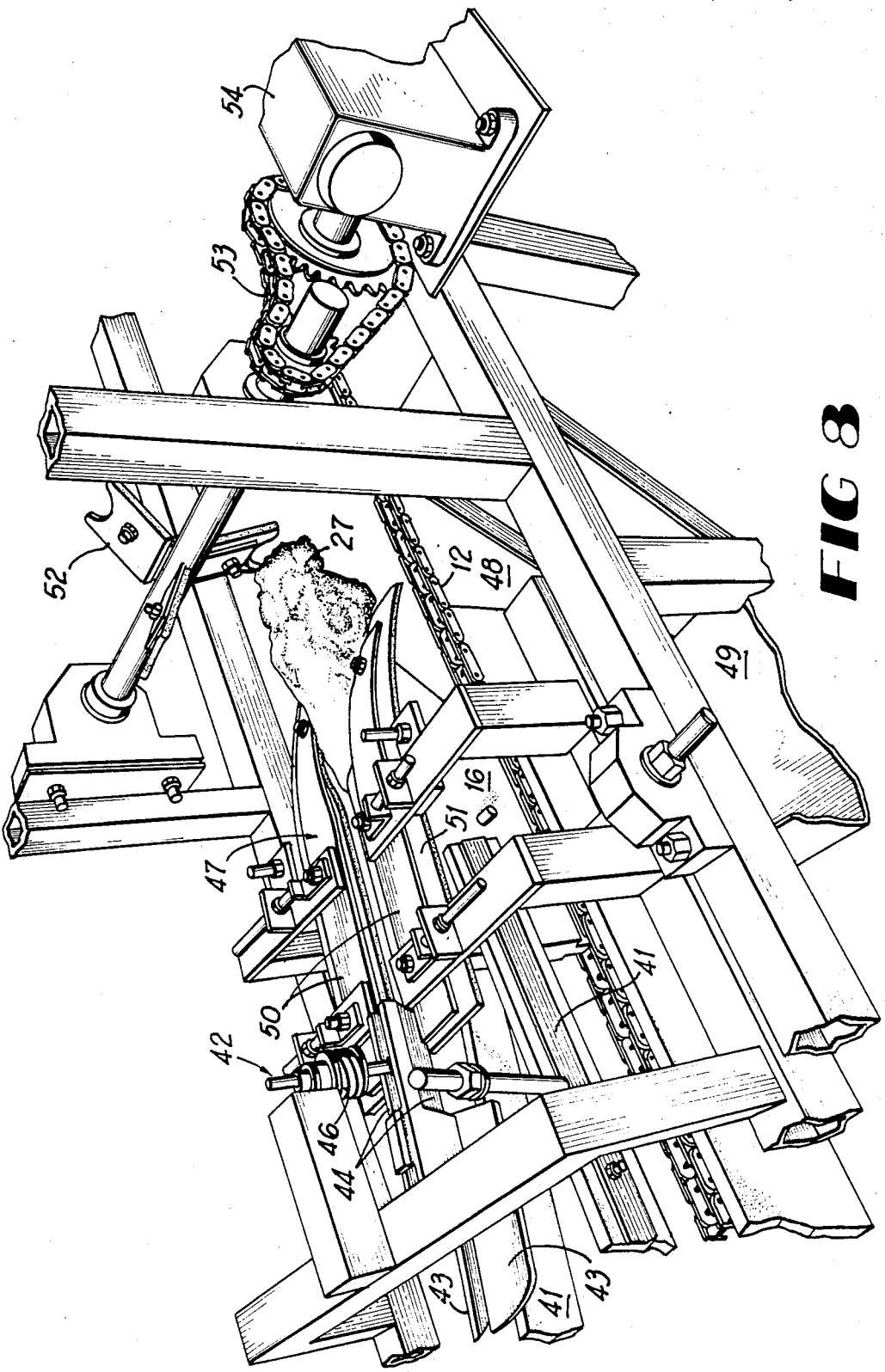

CHICKEN DEBONING APPARATUS AND METHOD

BACKGROUND OF THE INVENTION

The present invention relates to an apparatus used for the processing of poultry. Specifically, the invention is a machine for removing the meat and wings from a portion of an eviscerated chicken.

It is desirable, for both economy and safety, to automate poultry processing. Numerous machines have been described in the prior art, which can be used for various processing activities. For instance, U. S. Pat. No. 3,564,644 to Cannon describes an apparatus for slicing poultry breasts into sections. U. S. Pat. No. 3,943,600 to Cramer discloses a conveyor apparatus to sequentially separate a whole chicken into its usable parts. U. S. Pat. No. 3,946,461 to Martin discloses another breast sectioning machine. U. S. Pat. No. 4,270,243 to Lewis shows a device for splitting a chicken breast of a poultry carcass in half. U. S. Pat. No. 4,373,232 to Harding et al. is yet another machine which cuts a poultry carcass into pieces.

However, none of the prior art machines discussed relate to the removal of meat from the carcass. It is desirable to provide a machine which can simply and economically process chicken carcasses by removing the usable meat from the carcass.

SUMMARY OF THE INVENTION

The present invention is a continuous conveyor system which removes the wings and breast meat from the anterior or front half of an eviscerated poultry carcass. The machine comprises a continuously driven chain upon which is mounted a series of mandrels for carrying the chicken carcasses to be processed. As the chicken carcass is moved along the path of the chain, it is directed into a pair of circular saws which sever the wing bone joints from the body, but do not make a complete cut, such that the wings remain attached to the remainder of the carcass. The chicken is then conveyed toward two upward sloping toothed chains and each partially severed wings are guided between a toothed chain and a retaining guide bar. The toothed chain grips the wing and, since it is moving slower than the main conveyor chain, pulls the wings upward and backward from the carcass, causing the connected breast meat also to be pulled from the carcass. The combined wings and breast meat are then carried by the toothed chain to a collection bin.

The remainder of the carcass still has the tendon meat, or chicken fingers, remaining near either side of the center of the rib cage or sternum. The carcass is further carried by the main chain and mandrel into angularly tapered plates which hold the top of the carcass down on the mandrel while the rib cage is substantially compressed inward. Then the rib cage is passed under a pair of stationary blades which slice the tendon meat from the rib cage so that it may be removed from the carcass. Next, the carcass is brought between the edges of two scrapers, which scrape the tendon meat completely away from the carcass and allow the meat to drop into a collection bin. Finally, the carcass is tranported to the disposal end of the machine, where it is dropped into another collection bin.

Therefore, it is an object of this invention to provide a machine which automatically removes the breast meat from a poultry carcass.

It is a further object of this invention to provide a machine which can debone chicken carcasses at a high rate of speed.

It is yet a further object of the present invention to provide a machine fulfilling the previous objects which is uncomplicated in design and economical in use.

Those and other objects and advantages will appear from the following description with reference to the drawings.

BRIEF DESCRIPTION OF THE DRAWINGS

FIG. 1 is a side elevation, of a complete chicken deboning apparatus.

FIG. 8 is a cut-away perspective view of the apparatus showing the completion of the meat removal process.

DESCRIPTION OF THE PREFERRED EMBODIMENT

The preferred embodiment is now described with reference to the drawings, in which like numbers represent like parts throughout the views.

Figure 1A:
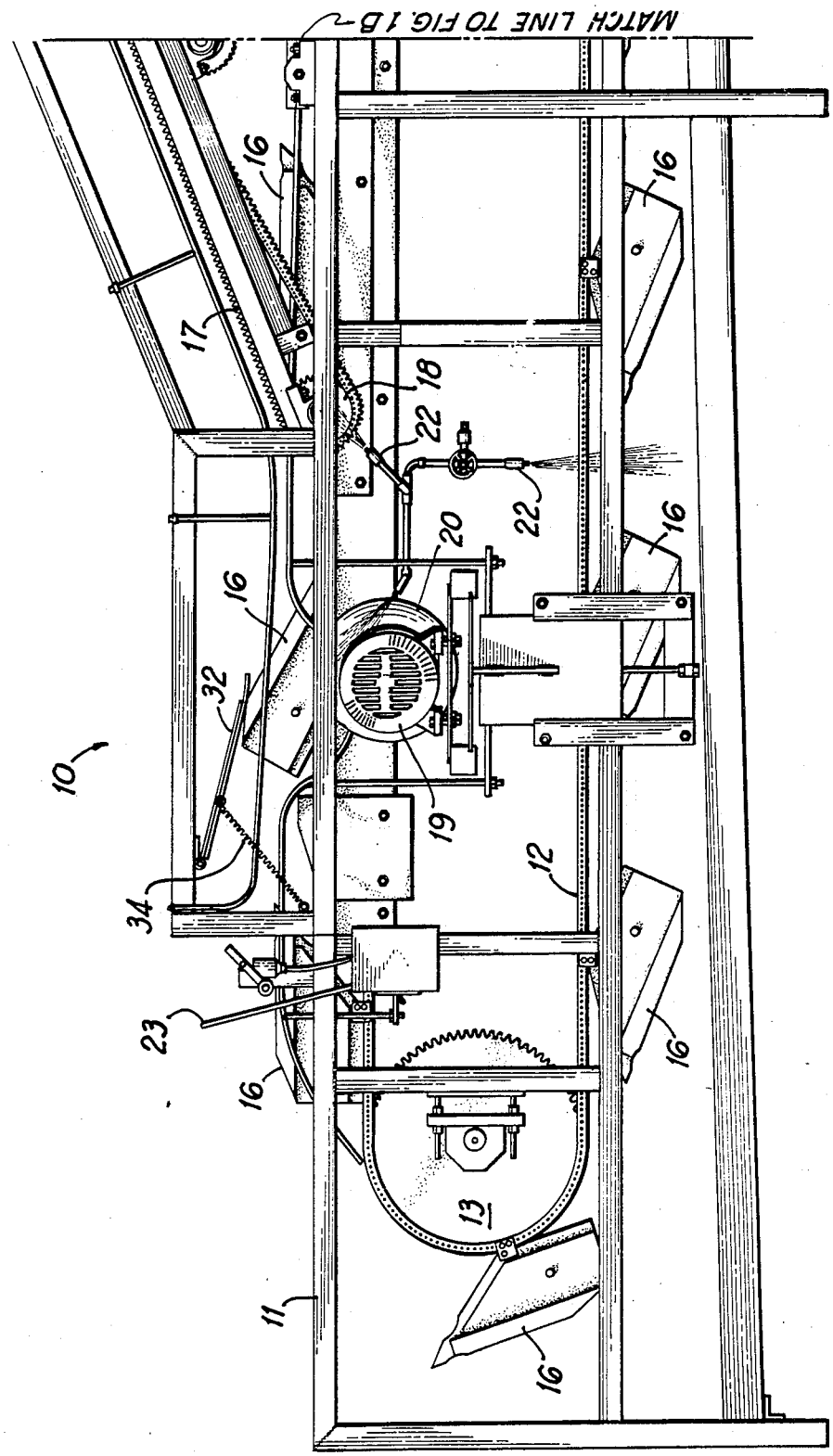
FIG. 1A is the front half of the apparatus and FIG. 1B is the remainder of the apparatus.
Figure 1B:
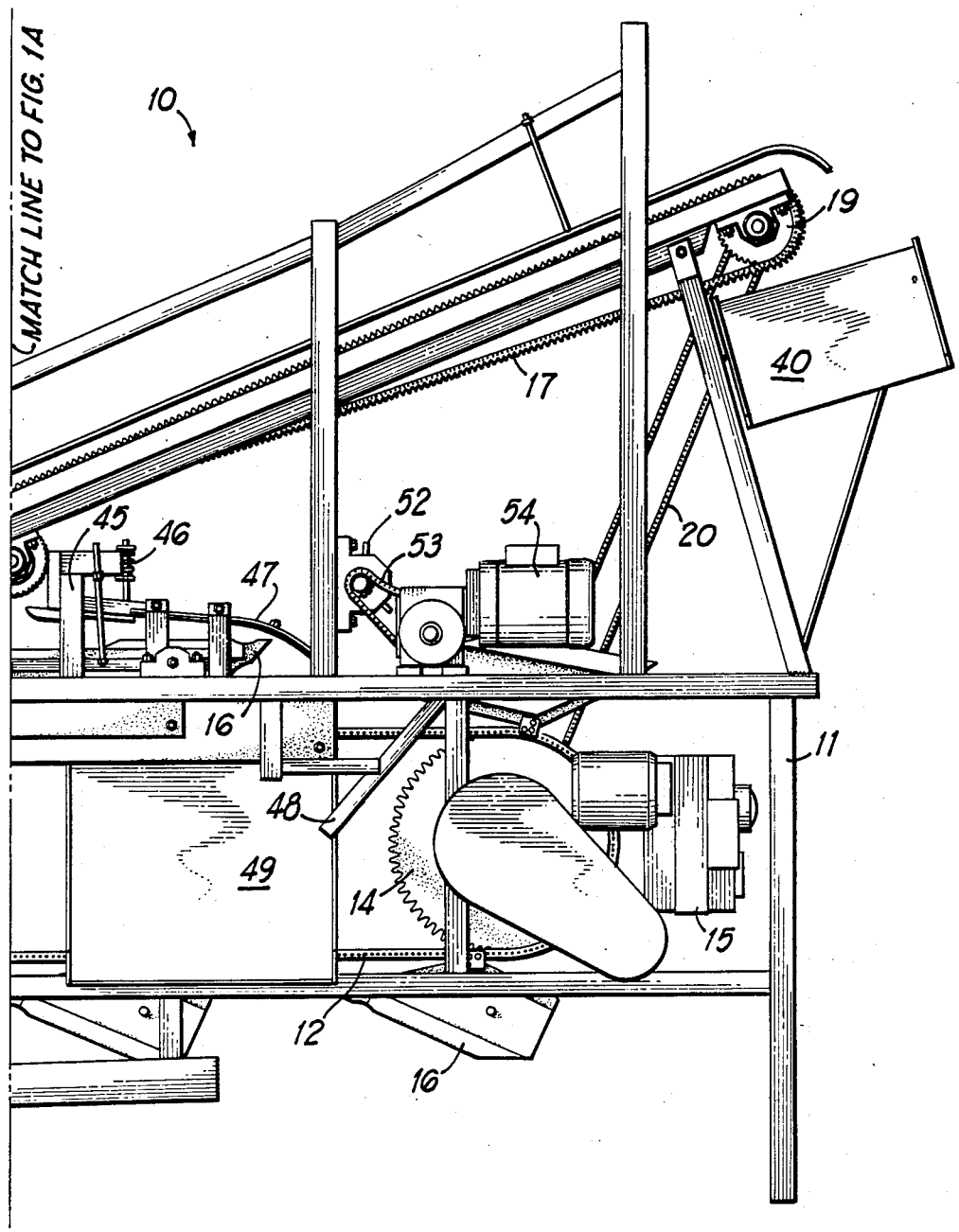

FIG. 1 shows the complete chicken deboning apparatus 10 from one side. The elements of the apparatus are supported on a frame 11. The main conveyor chain 12 fits around sprocket wheels 13, 14 located at either end of the frame. Wheel 14 is driven by motor 15. A series of mandrels 16 are pivotally mounted on the conveyor chain. Two toothed chains 17 are connected between sprocket wheels 18, 19 and incline upward from the conveyor chain. Sprocket wheel 19 is driven by drive chain 20, which, in turn, is driven by motor 15. Two motors 20 with circulating saw blades 21 are mounted on the frame in opposing relationship on either side of the chain 12. Various water spray mechanisms 22 may be appropriately mounted to wash down the toothed chains, the mandrels, and the saw blades. A "dead man" safety switch 23 may be provided to insure that the operator intends the machine to be in operation.

The apparatus and its operation will be described in detail with reference to FIGS. 2-8, which are detail drawings of various portions of the apparatus shown in FIG. 1.

Figure 2:
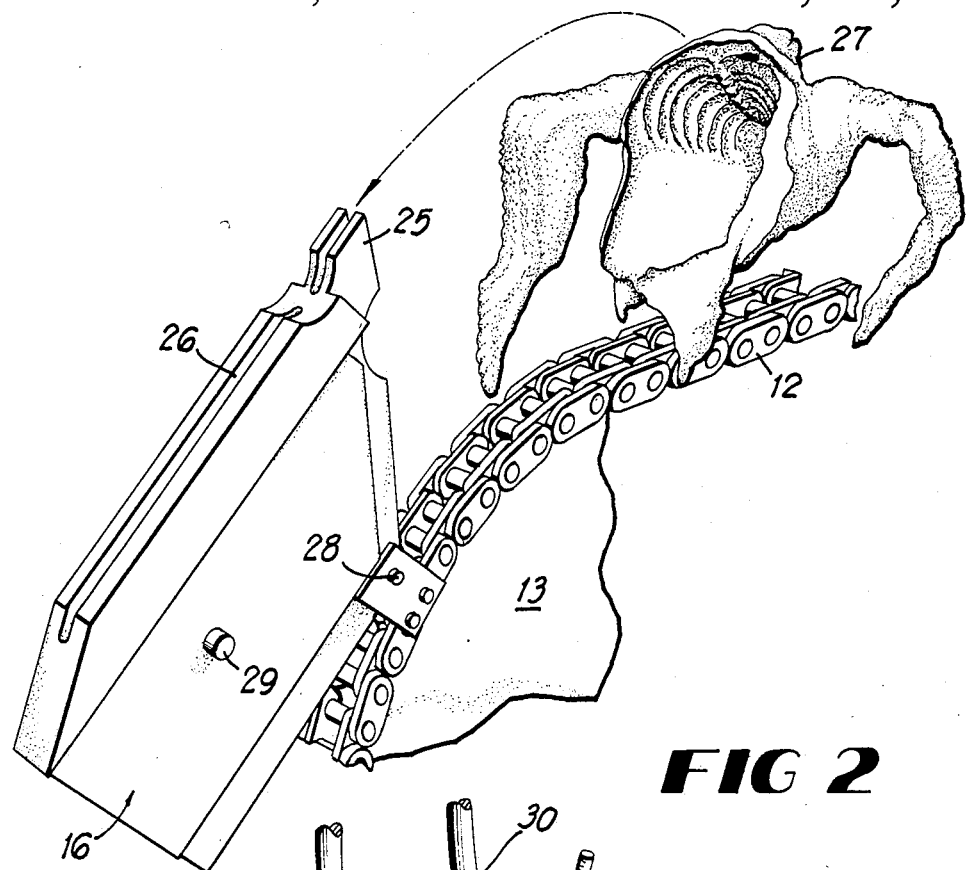
FIG. 2 is a cut-away view of the main conveying chain with an attached mandrel and showing a chicken carcass to be mounted thereon.

FIG. 2 shows the mandrel 16 coming around the sprocket wheel 13 to begin its travel through the processing stations of the invention. The front of the mandrel tapers to a point for fitting within the eviscerated front body portion of a chicken 27. The top of the mandrel has a groove 26 for receiving the center of the rib cage, which assists in keeping the chicken centered on the mandrel. The mandrel is mounted to chain 12 at a pivot 28. Normally the bottom of the mandrel rides on the top of the chain 12 as it travels along the upper path of the chain. However, projection 29 is utilized by the machine to tilt the mandrel 16 forward.

Figure 3:
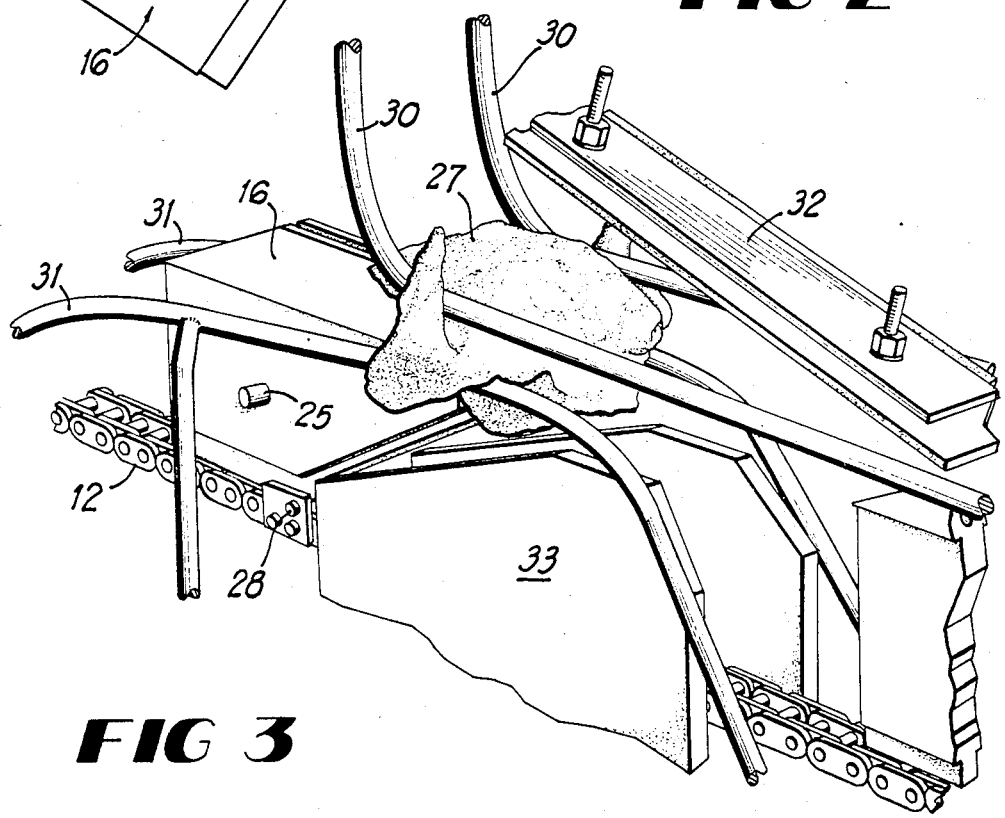
FIG. 3 is a cut-away perspective view of the portion of the apparatus where the carcass first enters the guide bars.

FIG. 3 shows the mandrel 16 with the chicken carcass 27 mounted thereon, as it is entering the first station, which is the wing-bone severing portion of the invention. Lower guide bars 31 provide support for the underside of the wing, while upper guide bars 30 hold the wings down against the lower guide bars 31. As the mandrel moves forward, cams 33 lift the projections 29 to tilt the mandrel forward and the chicken carcass downward. The lower guide bars 31 also bend downward at this point to provide a continuous support for the wings and to hold the wings away from the remainder of the carcass. A pivoting arm 32 holds the chicken down in place while in the tilted position. As can be seen in FIG. 1 the pivoting arm 32 is urged downward by spring 34.

Figure 4:
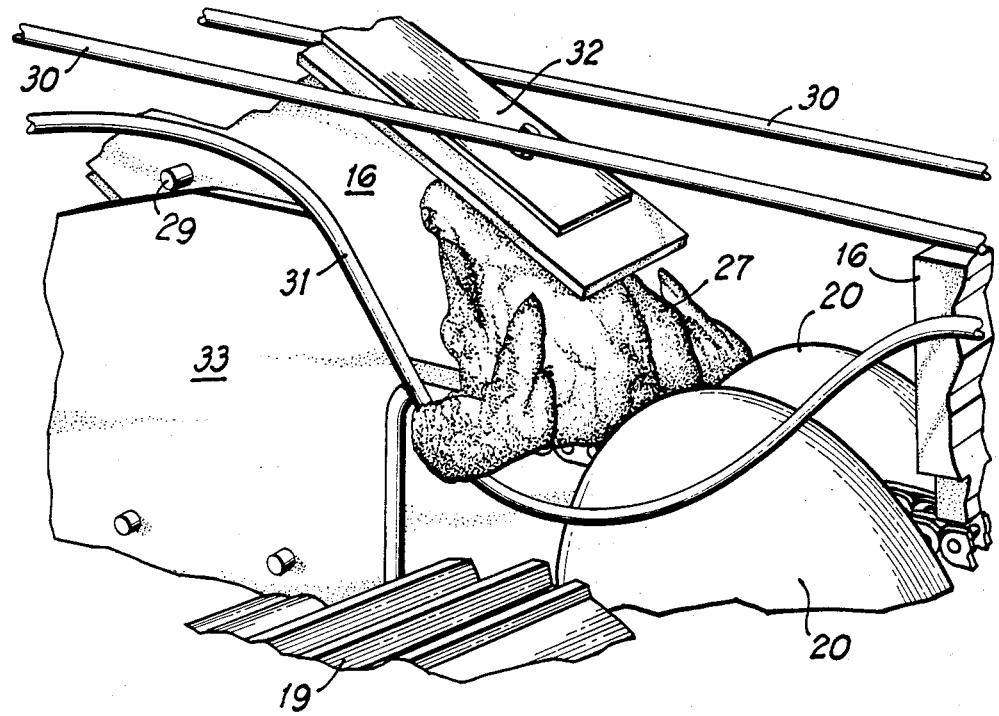
FIG. 4 is a cut-away perspective view of the portion of the apparatus where the chicken wings are introduced into the rotating saw blades.
Figure 5:
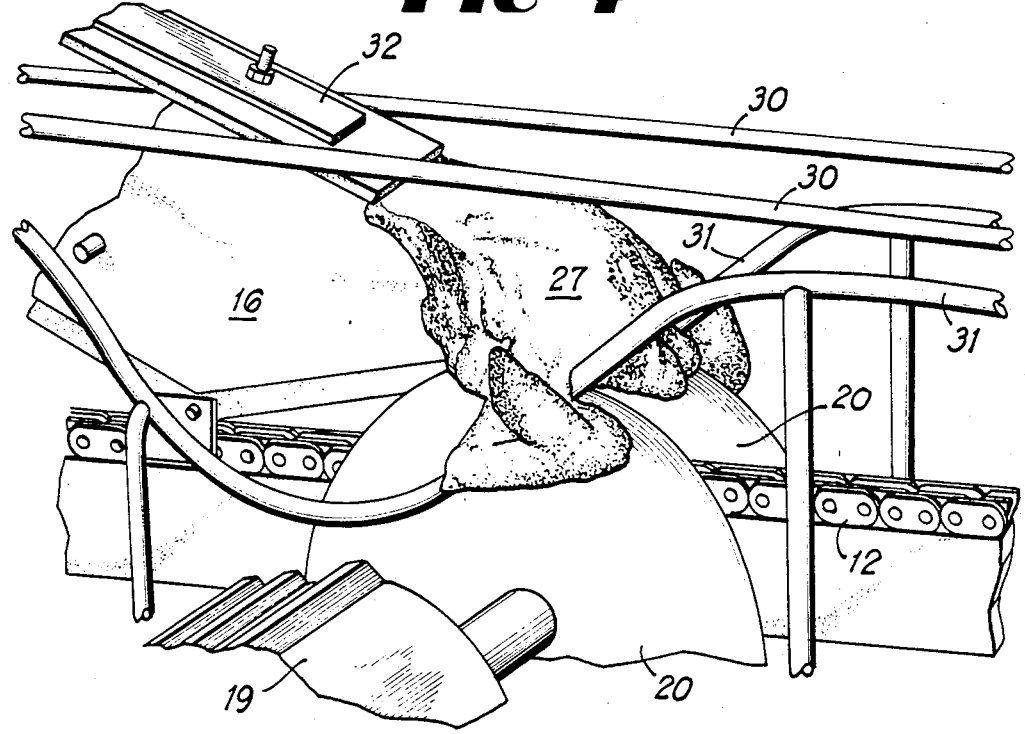
FIG. 5 is a cut-away perspective view showing the wings of the chicken after they pass over the saws.

Referring to FIGS. 4 and 5, the chicken 27 is introduced into the saw blades 20 at a downward angle. With the wings being held away by lower guide bars 31, the blades project just far enough to sever the wing-bone joint at the carcass, but not so far that the wing is completely severed from the body. As shown in FIG. 5, after the cutting is completed, the wings remain attached to the body of the chicken and ride upward on lower guide bars 31 until the wings are held between the upper guide bars 32, and lower guide bars 31.

Figure 6:
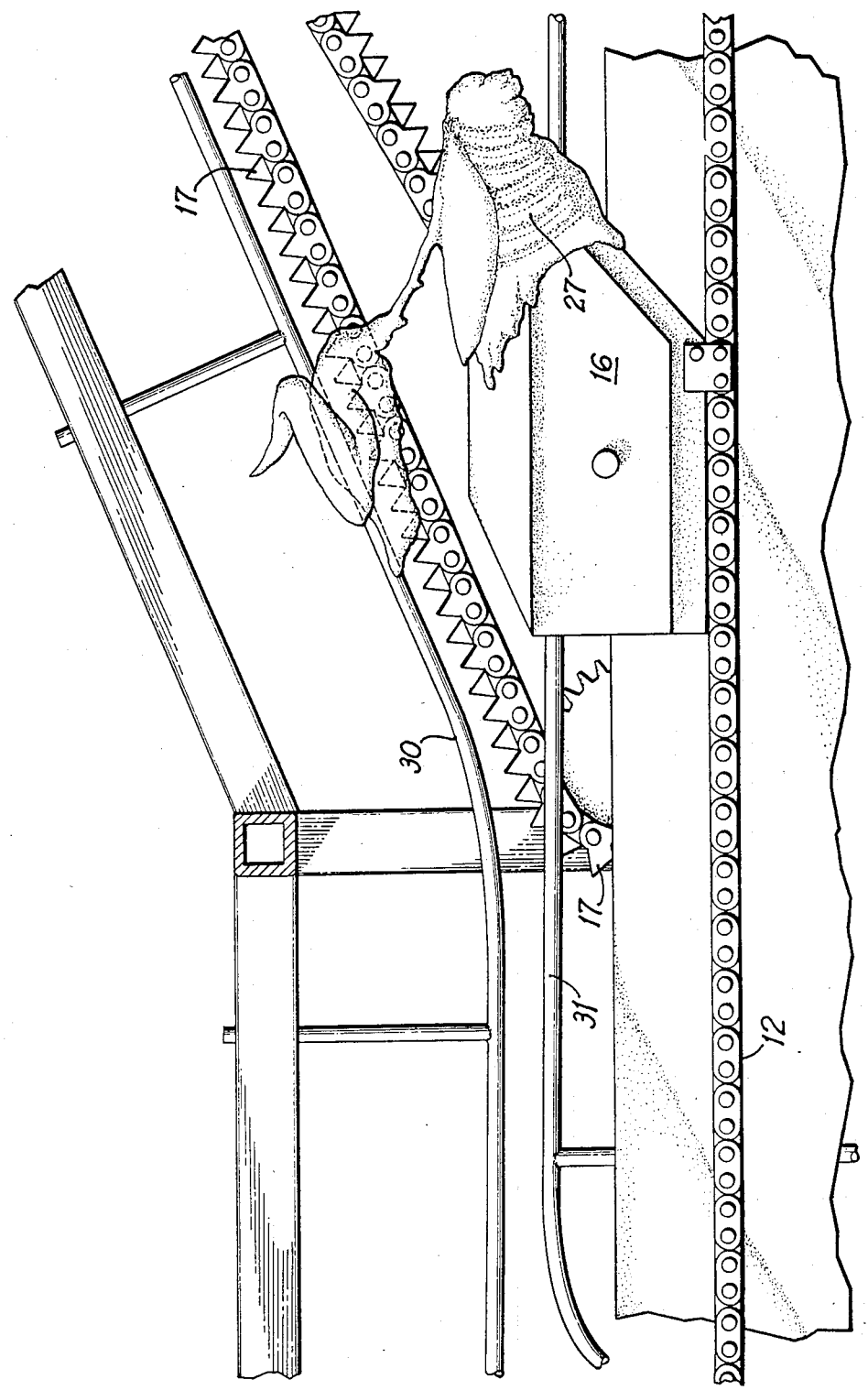
FIG. 6 is a cut-away side view of the portion of the apparatus where the toothed chain removes the chicken's wings and breast meat from the carcass.

Referring next to FIG. 6, the conveying chain 12 carries the mandrel 16 and chicken 27 forward until the wings are guided between the toothed chains 17 and the upper guide bars 30. The toothed chains 17 are formed by links which include outward protruding sawtooth points. Thus, one chain provides two parallel tracks of teeth, separated by the width of the chain.

The chicken wings are firmly gripped between the teeth of the chain 17 and the upper guide bar 30. The toothed chain and guide bar slope upward with respect to the path of the conveyor chain 12. Also, the forward velocity of the conveyor chain 12 is somewhat faster than the forward velocity of the toothed chain 17. Thus, the two wings are simultaneously pulled upward and rearward with respect to the carcass. This results in the removal of the wings and the breast meat from the rib cage of the chicken. The wings and breast meat are carried away to the end of the machine and dropped into bin 40, as seen in FIG. 1.

Figure 7:
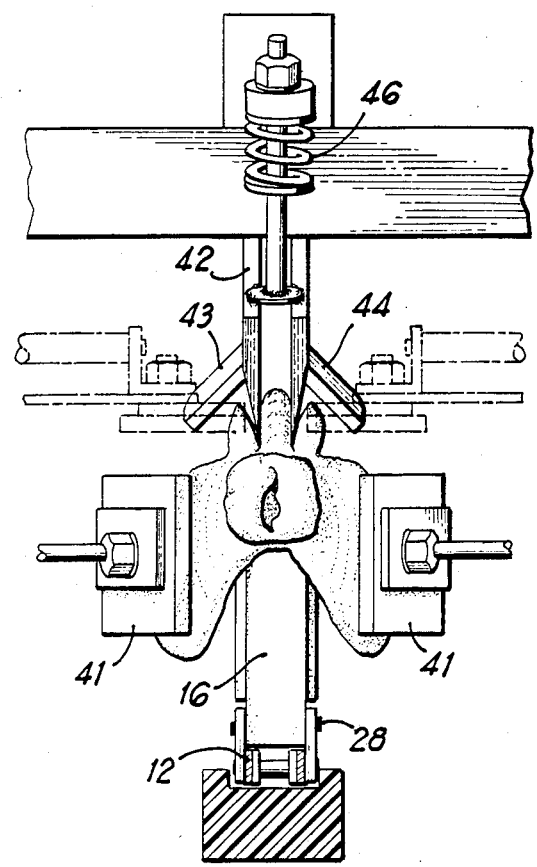
FIG. 7 is a section through a portion of the apparatus showing the tendon meat removal portion of the apparatus.

Referring to FIGS. 7 and 8 together, after the wings and breast meat are removed from the carcass the mandrel moves the chicken carcass to the next station to remove the tendon meat from the rib cage. The mandrel 16 moves between two opposed rib compressors 41, which are angled so that the horizontal distance between them decreases in the direction of movement of the mandrel. Juxtaposed above the rib compressor 41 is a unit 42 including combination guide-depressor 43 and integral paired slicing blades 44. The guide-depressor 43 works in cooperation with the rib compressors to keep the carcass centered and seated on the mandrell 16 while the rib cage is compressed flat against the sides of the mandrel. The unit 42 pivots on pivot 45 and is urged in downwardly angled position by spring 46, such that the slicing blades 44 slice the tendon meat progressively away from the rib cage as the mandrel moves the carcass along its path.

The mandrel then passes between a pair of scrapers 47, as shown in FIG. 8, which scrapes the tendon meat away from the carcass so that it falls away onto ramps 48 and 49 and into a collecting container. The scrapers 47 preferably comprise metal braces 50 with attached non-absorbent rubber facings 51 whose edges actually accomplish the scraping process.

Finally, the mandrel moves the carcass through the scrapers and into rotating paddles 52 located just above the carcass. The paddles are driven by chain 53 attached to motor 54. The paddles are shaped to grip around the top of the carcass and, by moving faster than the mandrel, positively disengage the carcass from the mandrel so it can be deposited in a disposal container at the end of its travel.

While the invention has been described in detail with particular reference to the preferred embodiment thereof, it will be understood that variations and modifications can be effected within the spirit and scope of the invention as previously described and as defined by the claims.

What is claimed is:

1. A process for deboning poultry which comprises the following steps:
   conveying the front half of the bird along a predetermined path on a conveying means wherein the remaining deboning steps are carried out;
   severing the joint between each wing and the body of the bird by cutting means such that the wings are not completely severed from the body; and then
   gripping the wings of the bird and pulling them away from the body such that the wings and connected breast meat are removed from the body.

2. The process of claim 1, which further comprises the further steps of:
   next slicing the tendon meat partially away from the sternum of the body of the bird; then
   scraping the tendon meat off the rib cage of the bird; and then
   discharging the remaining carcass from said conveying means.

3. The process of claim 1, wherein said gripping step is accomplished by guiding said wings into a continuous gripping means which pulls the wings progressively away from the direction of said conveying means.

4. The process of claim 3, wherein said slicing step comprises the steps of compressing the rib cage of the bird such that the sternum is raised and the tendon meat is presented to means for slicing the tendon meat on either side of the sternum, and wherein said slicing means comprises a pair of stationary blades under which said conveying means moves.

5. The process of claim 2, wherein said conveying means comprises a mandrel upon which the bird is mounted so that it will be correctly positioned during each of the steps of the process.

6. The process of claim 1, wherein said wing joint severing step comprises guiding said wings by guide means for holding said wings away from the body and for limiting the depth that said cutting means cuts into the bird.

7. An apparatus for deboning poultry which comprises:
   conveying means for carrying front half of the bird along a predetermined path;

cutting means for serving the joint between each wing and the body of the bird such that the wings are not completely removed from the body; and gripping means, located after said cutting means on said predetermined path, for pulling the wings away from the body such that the wings and connected breast meat are removed from the body.

8. The apparatus of claim 7, which further comprises:

means for slicing the tendon meat partially away from the sternum of the body of the bird, said slicing means located after said gripping means on said predetermined path;

means for scraping the tendon meat off of the rib cage of the bird, said scraping means located after said slicing means along said predetermined path; and means for discharging the remaining carcass from said conveying means at the end of said predetermined path.

9. The apparatus of claim 7, wherein said conveying means comprises at least one mandrel shaped to have mounted thereon the eviscerated body of a bird, wherein said mandrel is moved along said predetermined path and may be positioned along the way to cooperate with the other elements of the apparatus.

10. The apparatus of claim 9, wherein said cutting means comprises a pair of circulating saw blades located on either side of said predetermined path, and guide means to cause the wings to be held away from the body to enable said blades to pass between said wings and body.

11. The apparatus of claim 10, which further comprises means to cause said mandrel to tilt the front of the bird into said blades and then to cause the bird to be raised above said blades to prevent the wings from being completely cut away from the body.

12. The apparatus of claim 9, wherein said gripping means comprises a pair of toothed chains on either side of said mandrel and angled upward from the path of said conveying means such that the wings of the bird pass into said toothed chains which then pull the wings and breast meat progressively upward away from the body of the bird.

13. The apparatus of claim 12, wherein the horizontal velocity of said toothed chain is less than the velocity of said conveying means, such that the wings are pulled both upward and rearward from the body.

14. The apparatus of claim 9, wherein said means for slicing the tendon meat comprises: means for compressing the rib cage of the bird such that the sternum projects upward from the remainder of the body; and two stationary blades between which the sternum passes for slicing the tendon meat away from the sternum.

15. The apparatus of claim 14, wherein said scraping means comprises angled scraping arms located on either side of said predetermined path at a distance such that the edges of said arms scrape the remaining meat from the compressed rib cage as the mandrel passes therebetween.

16. The apparatus of claim 9, wherein said discharging means comprises paddle means for removing the carcass from said mandrel.

17. An apparatus for deboning the front half of a chicken body which comprises:

a motor driven conveying chain located generally horizontally along the length of the apparatus;

a plurality of vertical mandrels pivotally attached to said conveying chain, said mandrels having a frontward extending tapered portion for accepting the chicken body thereon;

upper and lower wing guides on either side of said conveying chain;

a first station along the path of said conveying chain comprising two motor driven circulating saw blades juxtaposed on either side of said mandrels passing therebetween, and cam means for tilting said mandrel forward on its pivot while between said blade;

a second station along the path of said conveying chain which comprises two motor driven toothed chains located on either side of the conveying chain, and guide bars for first directing the wings of a chicken located on said mandrel into said toothed chains and then for holding the wings in the teeth of said chains said toothed chains being angled upward from the point where the wings enter said toothed chains;

a third station along the path of said conveying chain which comprises a depressor for holding the chicken body on the mandrel; a pair of compressors on either side of the mandrel as it passes therebetween, such compressors being inwardly angled such that, as a chicken body passes therebetween, the rib cage of the chicken is compressed against the sides of the mandrel; a pair of stationary blades, parallel to the path of said conveying chain and located above the mandrels passing thereunder, for slicing the tendon meat away from the sternum and a pair of horizontal scraping blades, located on either side of said mandrel passing therebetween after is passes under said pair of stationary blades, the inner edges of said scraping blades being angled downward with respect to the path of removal of said mandrel and approximately located to said mandrel such that meat is scraped downward and off of a chicken carcass located on said mandrel; and a fourth station along the path of said conveying chain which comprises a motor driven rotating paddle for gripping the top of the chicken carcass and removing it from the mandrel.

* * * * *